United States Patent
Walsh

(10) Patent No.: US 6,564,280 B1
(45) Date of Patent: May 13, 2003

(54) COMMUNICATION CONTROLLER CONFIGURABILITY FOR OPTIMAL RESOURCE USAGE

(75) Inventor: James J. Walsh, Austin, TX (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 0 days.

(21) Appl. No.: 09/562,401

(22) Filed: May 1, 2000

(51) Int. Cl.[7] .................... G06F 13/00; G06F 13/38
(52) U.S. Cl. ................ 710/305; 710/306; 710/104; 710/317; 710/52; 370/402
(58) Field of Search .................. 710/305, 306, 710/317, 104, 310, 56, 100, 52, 105; 370/402, 412, 911; 711/119; 341/110, 155; 709/232; 375/220

(56) References Cited

U.S. PATENT DOCUMENTS 6,098,110 A * 8/2000 Witkowski et al.
6,151,644 A * 11/2000 Wu
6,397,268 B1 * 5/2002 Cepulis

* cited by examiner

*Primary Examiner*—Gopal C. Ray
(74) *Attorney, Agent, or Firm*—Meyertons Hood Kivlin Kowert & Goetzel, P.C.; Jeffrey C. Hood

(57) ABSTRACT

A system and method for dynamically configuring communication components in a computer system. The method may operate in a computer system including a plurality of buffers, a plurality of bus master engines and a bus interface unit. A plurality of communication medium interfaces may be coupled to the bus interface unit. Bus master engines, buffers and communication medium interfaces are dynamically configurable so that a set or subset of bus master engine(s), buffer(s) and communication medium interface(s) can be used in either a single or multiple peripheral bus function(s).

31 Claims, 5 Drawing Sheets

COMMUNICATION CONTROLLER CONFIGURABILITY FOR OPTIMAL RESOURCE USAGE

FIELD OF THE INVENTION

The present invention relates to the field of data communications and more particularly to dynamically configuring bus master engines and other hardware resources to effectively use these hardware resources for various peripheral bus functions.

DESCRIPTION OF THE RELATED ART

Data may be communicated across a transmission medium at different rates and using different protocols. For example, a conventional voice-band modem can connect computer users through a Public Switched Telephone Network (PSTN). The data transmission rate of a voice-band modem is typically 56 kilobits/second (Kbps). As consumer demand for interactive electronic access to entertainment (e.g. video-on-demand) and information (e.g. Internet) in digital format has increased, this demand has exceeded the capabilities of conventional voice-band modems. Consequently, new technologies have been developed to transmit data at a faster rate.

One such technology allows relatively high-speed data transmission over existing copper-based twisted-pair lines connecting a home to the telephone company central office. This technology, referred to as digital subscriber line (DSL) technology, includes various species, including high-bit-rate DSL (HDSL), very high-bit-rate (VDSL), and asymmetric DSL (ADSL). These different types of digital subscriber line technologies are generically referred to as "xDSL" technologies. Each of these technologies allows digital information to be transmitted from a service provider over existing copper telephone lines at rates as high as 6 megabits/second (Mbps).

Computer systems may consequently receive data that has been transmitted at different rates and using different protocols. In order to accommodate these different communication standards, computer systems may be configured to implement a communication medium interface for each type of data rate and protocol. A communication medium interface may include a codec (coder/decoder). A codec may include an A/D converter, a D/A converter and a serial interface for a respective data rate and protocol.

The A/D converter of a communication medium interface receives analog samples of the data being transmitted across the transmission medium and converts these samples into digital data. The digital data is then stored in a buffer. A bus master engine then generates a request to become master of a peripheral bus, such as a Peripheral Component Interconnect (PCI) bus. Once the bus arbiter grants the request of the bus master engine, the bus master engine then transfers the contents of the buffer into a host memory. The host processor then processes the samples.

In contrast, when the host desires to output communication data, the host processor may create output samples and place them in the host memory. When the PCI bus arbiter grants the request of the bus master engine to become master of the PCI bus, the bus master engine transfers these output samples into a buffer. These output samples may then be converted into analog signals by the D/A converter of the communication medium interface before being transmitted across the transmission medium.

A PCI function, e.g., voice-band modem, DSL modem, LAN, etc., may be typically associated with a set of a bus master engine, a buffer and a communication medium interface. For example, a particular communication medium interface may be configured to receive data at a rate of 56 kbps (voice-band modem). Once the A/D converter in the communication medium interface receives analog data, a digitized version of this analog data may only be stored in the buffer associated with that particular PCI function, i.e., the voice-band modem. Furthermore, a bus master engine associated with that particular PCI function, i.e., the voice-band modem, transfers the contents of the buffer associated with the voice-band modem into a host memory upon granting of the request from the PCI arbiter.

Unfortunately, the above-described configuration is not flexible across a variety of communication medium interfaces. For example, when a plurality of telecommunication standards are supported, a plurality of sets of bus master engines, buffers and communication medium interfaces are required in prior art systems. In addition, in prior art systems, components used by different telecommunication standards cannot be shared. This may result in a duplication of hardware resources, which is an unnecessary expense.

It would therefore be desirable that a set or subset of bus master engine(s), buffer(s) and communication medium interface(s) can be used in multiple peripheral bus function (s) that do not operate simultaneously. It would further be desirable that a plurality of individual components be aggregated together with other components to perform a single peripheral bus function, e.g., a plurality of buffers be used together with at least one bus master engine and at least one communication medium interface to perform a single peripheral bus function.

SUMMARY OF THE INVENTION

The problems outlined above may at least in part be solved by a computer system including a processor, a memory coupled to the processor, a peripheral bus coupled to the memory and processor as well as a bridge coupled to the peripheral bus. The bridge may comprise a peripheral bus interface coupled to the peripheral bus and a communication controller coupled to the peripheral bus interface. The communication controller may comprise a plurality of buffers each configured to store data, a plurality of bus master engines coupled to the plurality of buffers and a bus interface unit coupled to the plurality of buffers. The plurality of bus master engines may be configured to transfer data between the plurality of buffers and the memory. Furthermore, a plurality of communication medium interfaces may be coupled to the bus interface unit of the communication controller. Each of the plurality of communication medium interfaces may be configured to receive data from a transmission medium and store the data in at least one of the plurality of buffers. Furthermore, each of the plurality of communication medium interfaces may be configured to receive data from at least one of the plurality of buffers and provide the data to the transmission medium.

According to one embodiment of the invention, the bus master engines, buffers and communication medium interfaces are dynamically configurable so that a set or subset of bus master engine(s), buffer(s) and communication medium interface(s) can be used in either a single or multiple peripheral bus function(s). For example, a set of at least one of the plurality of bus master engines and at least one of the plurality of buffers can be used to perform multiple peripheral bus functions that do not operate simultaneously. Furthermore, a set of at least one of the plurality of bus master engines, at least one of the plurality of buffers and at least one of the plurality of communication medium interfaces can be used in multiple peripheral bus functions. Moreover, a plurality of buffers can be used or aggregated together with at least one of the plurality of bus master engines and at least one of the communication medium interfaces to perform a single peripheral bus function. Furthermore, a plurality of bus master engines and/or a plurality of buffers can be used together with at least one of the communication medium interfaces to perform a single peripheral bus function.

BRIEF DESCRIPTION OF THE DRAWINGS

A better understanding of the present invention can be obtained when the following detailed description of the preferred embodiment is considered in conjunction with the following drawings, in which.

DETAILED DESCRIPTION OF THE PREFERRED EMBODIMENT

One embodiment of the present invention may be utilized in a system comprising a plurality of bus master engines and a plurality of buffers in a bridge unit as well as a plurality of communication medium interfaces coupled to the bridge unit. According to one embodiment of the invention, a set or a subset of at least one of the plurality of bus master engines, at least one of the plurality of buffers and at least one of the plurality of communication medium interfaces can be used in multiple peripheral bus functions that do not operate simultaneously. According to another embodiment of the invention, a plurality of similar components may be aggregated or used together to perform a single peripheral bus function, e.g., a plurality of buffers may be used together with at least one of the plurality of bus master engines and at least one of the plurality of communication medium interfaces to perform a single peripheral bus function.

Figure 1:
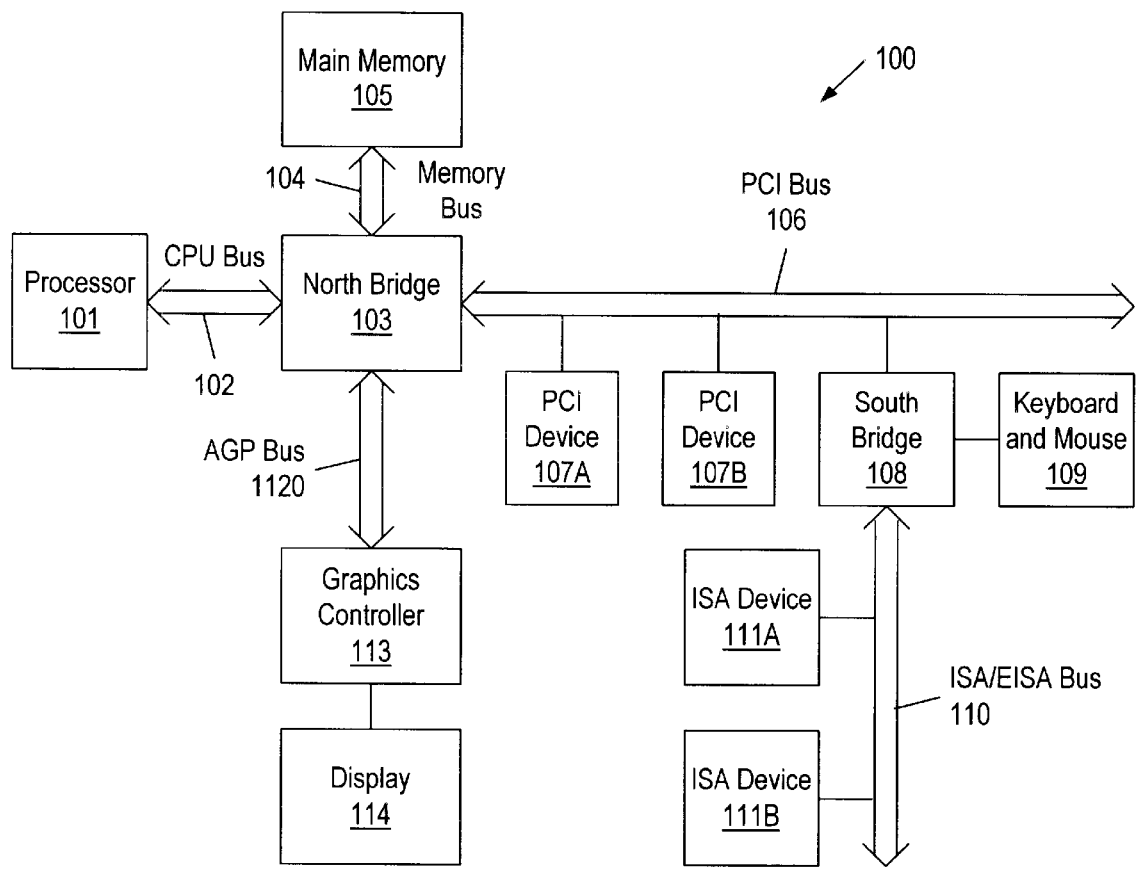
FIG. 1 illustrates an embodiment of a computer system including a south bridge unit.

FIG. 1—Computer System

FIG. 1 illustrates an embodiment of a computer system 100 which may include the present invention. It is noted that FIG. 1 is exemplary, and the invention may be used in other systems or architectures. The computer system shown in FIG. 1 may include a processor 101 coupled to a variety of system components through a north bridge unit 103 via a CPU bus 102. In the depicted system, a main memory 105 may be coupled to north bridge unit 103 through a memory bus 104, and a graphics controller 113 may be coupled to north bridge unit 103 through an AGP bus 112. Furthermore, a plurality of PCI devices 107A and 107B may be coupled to north bridge unit 103 through a PCI bus 106. A secondary bridge unit, south bridge unit 108, may further be provided to accommodate an electrical interface to one or more EISA or ISA devices 111A and 111B through an ISA/EISA bus 110.

In addition to providing an interface to an ISA/EISA bus 110, south bridge unit 108 may further incorporate additional functionality, as desired. For example, in one embodiment, south bridge unit 108 includes a master PCI arbiter (not shown) for arbitrating ownership of PCI bus 106. South bridge unit 108 may additionally incorporate a disk drive controller, an interrupt controller, and power management support functionality. An input/output controller (not shown), either external from or integrated with south bridge unit 108, may also be included within computer system 100 to provide operational support for a keyboard and mouse 109 and for various serial and parallel ports, as desired.

Processor 101 is illustrative of, for example, an Athlon™ Microprocessor. It is understood, however, that in other embodiments of computer system 100, alternative types of microprocessors could be employed. An external cache unit (not shown) may further be coupled to processor 101 in other embodiments.

Main memory 105 is a memory in which application programs are stored. Processor 101 primarily executes out of main memory 105. A suitable main memory 105 comprises Dynamic Random Access Memory (DRAM), and preferably a plurality of banks of Synchronous DRAM (SDRAM).

PCI devices 107A and 107B are illustrative of a variety of peripheral devices such as, for example, network interface cards, video accelerators, audio cards, hard or floppy disk drives, SCSI (Small Computer Systems Interface) adapters and telephony cards. Similarly, ISA devices 111A and 111B are illustrative of various types of peripheral devices such as a modem, a sound card, or a variety of data acquisition cards.

Graphics controller 113 is provided to control the rendering of text and images on a display 114. Graphics controller 113 may embody a typical graphics accelerator generally known in the art to render three-dimensional data structures that can be effectively shifted into and from main memory 105. Graphics controller 113 may therefore be a master of AGP bus 112 in that it can request and receive access to a target interface within north bridge unit 103 to thereby obtain access to main memory 105. A dedicated graphics bus accommodates rapid retrieval of data from main memory 105. For certain operations, graphics controller 113 may further be configured to generate PCI protocol transactions on AGP bus 112. The AGP interface of north bridge unit 103 may thus include functionality to support both AGP protocol transactions as well as PCI protocol target and initiator transactions. Display 114 is any electronic display upon which an image or text can be presented. A suitable display 114 may include a cathode ray tube ("CRT"), a liquid crystal display ("LCD"), etc.

Figure 2:
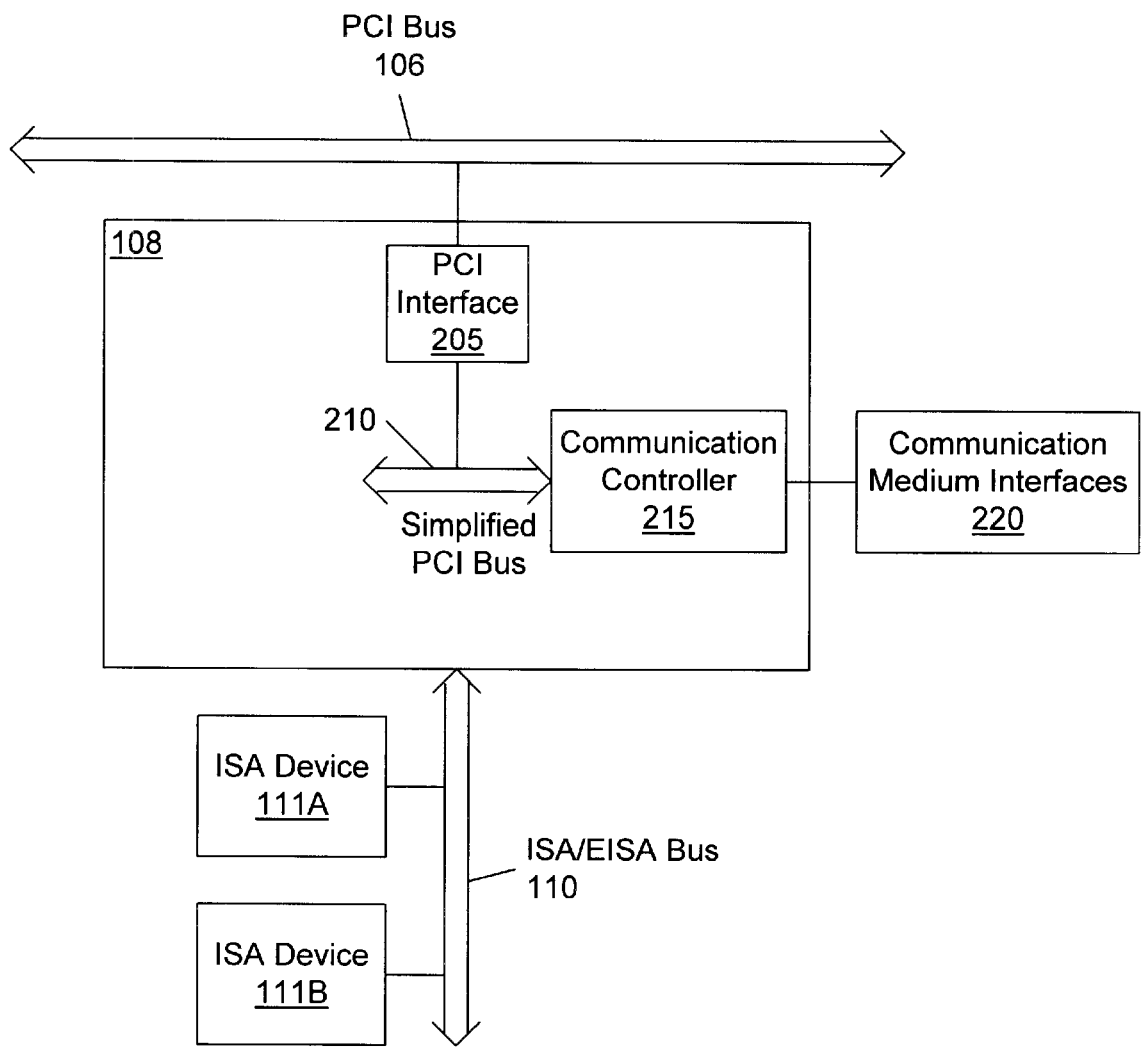
FIG. 2 illustrates an embodiment of south bridge unit including a communication controller.

FIG. 2—South Bridge Unit Including Communication Controller

FIG. 2 illustrates an embodiment of south bridge unit 108 including a PCI interface 205 coupled to a simplified PCI bus 210 which is coupled to a communication controller 215. South bridge unit 108 is coupled to PCI bus 106 via PCI interface 205 and is further coupled to communication medium interfaces 220. South bridge unit 108 further provides an electrical interface to one or more EISA or ISA devices 111A and 111B through an ISA/EISA bus 110. An explanation of the functionality of communication medium interfaces 220 and communication controller 215 will be provided below.

Figure 3:
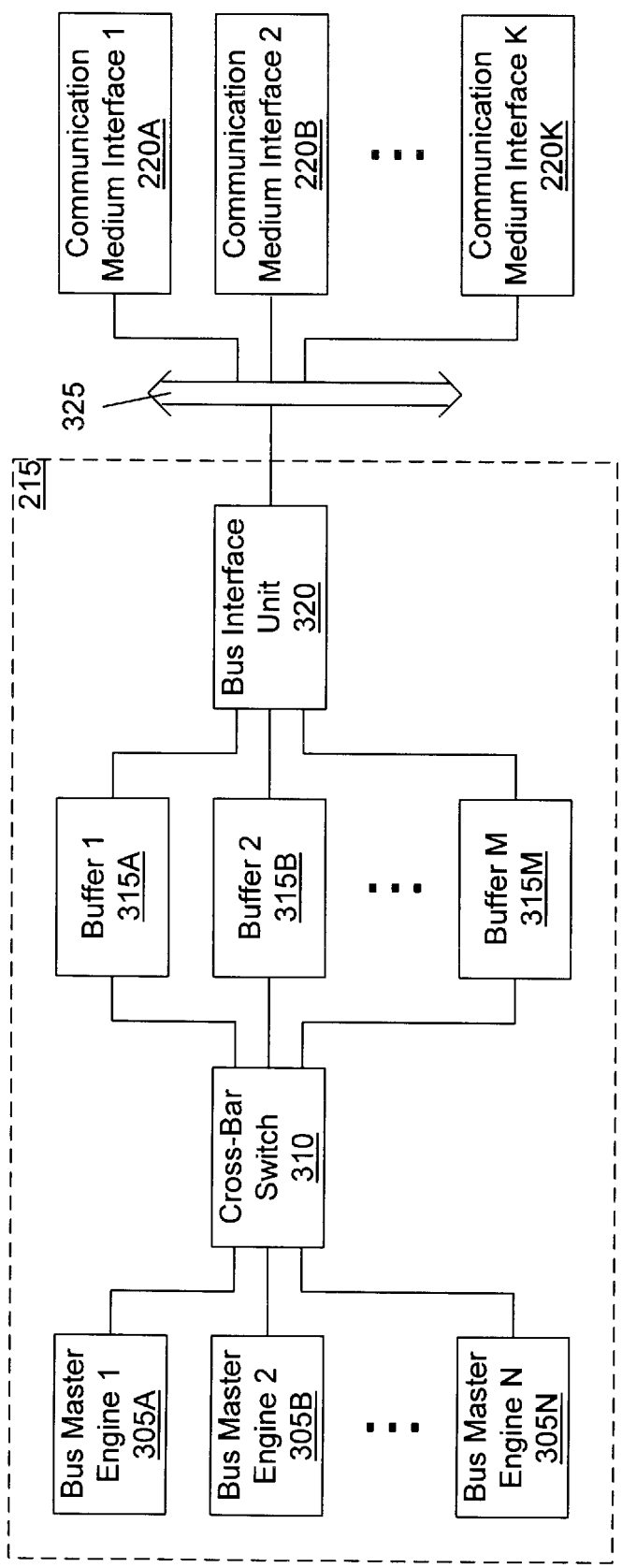
FIG. 3 illustrates an embodiment of a communication controller interacting with a plurality of communication medium interfaces.

FIG. 3—Communication Controller Interacting with a Plurality of Communication Medium Interfaces FIG. 3 illustrates an embodiment of communication controller 215 including a plurality of bus master engines 305A–N coupled to a cross-bar switch 310 which is coupled to a plurality of buffers 315A–M. Communication controller 215 further includes a bus interface unit 320 coupled to the plurality of buffers 315A–M. FIG. 3 further illustrates communication controller 315 coupled to a serial link bus 325 which is coupled to a plurality of communication medium interfaces 220A–K. It is noted that any number of bus master engines 305A–N, any number of buffers 315A–M or any number of communication medium interfaces 220A–K may be implemented in different embodiments of the present invention. It is further noted that bus master engines 305A–M may, individually or collectively be referred to as bus master engine 305 or bus master engines 305, respectively. It is further noted that buffers 315A–M may, individually or collectively be referred to as buffer 315 or buffers 315, respectively. It is further noted that communication medium interfaces 220A–K may, individually or collectively be referred to as communication medium interface 220 or communication medium interfaces 220, respectively.

According to one embodiment of the invention, bus master engines 305, cross-bar switch 310, buffers 315, bus interface unit 320 and communication medium interfaces 220 are dynamically configurable so that a set or subset of bus master engine(s) 305, buffer(s) 315 and communication medium interface(s) 220 can be used in either a single or multiple peripheral bus function(s). Peripheral bus functions include one or more of a voice-band modem, DSL modem, AC 97 modem, LAN, USB controller, Ethernet controller, a PCI to ISA bridge, etc.

In the embodiment of FIG. 3, a set of at least one of the plurality of bus master engines 305 and at least one of the plurality of buffers 315 are dynamically configurable and can be used to perform multiple peripheral bus functions that do not operate simultaneously. Furthermore, a set of at least one of the plurality of bus master engines 305, at least one of the plurality of buffers 315 and at least one of the plurality of communication medium interfaces 220 are dynamically configurable and can be used in multiple peripheral bus functions that do not operate simultaneously.

In another embodiment of the invention, bus master engine 305, cross-bar switch 310, buffers 315, bus interface unit 320, and communication medium interfaces 220 are dynamically configurable so that a plurality of components can be combined or used together to perform a single peripheral bus function. In the embodiment of FIG. 3, for example, a plurality of buffers 315 can be used together with at least one of the plurality of bus master engines 305 and at least one of the communication medium interfaces 220 to perform a single peripheral bus function. Furthermore, a plurality of bus master engines 305 and a plurality of buffers 315 can be used together with at least one of the communication medium interfaces 220 to perform a single peripheral bus function. It is noted that other sets or subsets of bus master engine(s) 305, buffer(s) 315 and communication medium interface(s) 220 can be used to perform either a single or multiple peripheral bus function(s) in other embodiments of the present invention.

In a particular embodiment, a software driver, e.g., a modem driver, configures the bus master engines 305, cross-bar switch 310, buffers 315, bus interface unit 320 and communication medium interfaces 220. In another particular embodiment, application software, operating system software, or other software, e.g., BIOS configures above the components.

Each peripheral bus function may be associated with a particular configuration space. A plurality of registers (not shown) in bus master engines 305 may be associated with the particular configuration space. In a particular embodiment, one or more registers (not shown) in bus master engines 305 associated with the particular configuration space may define the size of the memory and I/O space. In another particular embodiment, one or more registers (not shown) in bus master engines 305 associated with the particular configuration space may define a set or subset of bus master engines 305, buffers 315 and communication medium interfaces 220 to be associated with a particular peripheral bus function. In another embodiment, one or more registers (not shown) in bus master engines 305 associated with the particular configuration space may define whether a peripheral bus function can use multiple buffers 315 and if so which particular buffers 315. In each of the cases cited above, processor 101 writes to the one or more registers (not shown) in bus master engines 305 to configure and reconfigure the various components, as needed.

As stated earlier, communication medium interfaces 220 may include an A/D converter (not shown), a D/A converter (not shown) and a serial interface (not shown) for each type of data rate and protocol. Serial interface is coupled between the A/D and D/A converters and communication controller 215. In one embodiment at least one communication medium interface 220 is included for each type of data and protocol. It is also noted that one or more communication medium interfaces 220 may be associated with either a single or multiple peripheral bus function(s). Communication medium interfaces 220 may be telephone line interfaces or may be other types of communication interfaces, such as network interfaces, e.g., Ethernet, etc. For example, communication medium interfaces 220 may be configured to receive and transmit data according to one of the following protocols: digital subscriber line (xDSL), such as high-bit-rate digital subscriber line (HDSL), very high-bit-rate digital subscriber line (VDSL), asymmetrical digital subscriber line (ADSL), G.Lite, Ethernet PHY, V.90, ATM, etc.

During a read operation, the A/D converter is coupled to receive data being transmitted, using a certain rate and protocol, across a transmission medium. The A/D converter receives analog signals of the data being transmitted across the transmission medium and converts the analog signals to digital data or digital samples. These samples are then transmitted across the serial interface to serial link bus 325.

Bus interface unit 320 receives the digital data or samples from serial link bus 325. Bus interface unit 320 is configured to store the data in one or more buffers 315 associated with the particular peripheral bus function. For example, digital data produced by the A/D converter in communication medium interface 220 may be associated with a voice-band modem, i.e., a particular PCI function. This digital data may then be stored in one or more buffers 315 associated with that particular peripheral bus function, i.e., voiceband modem. In a particular embodiment, if more than one buffer 315 is associated with the peripheral bus function, bus interface unit 320 will transfer the data into buffer(s) 315 that is (are) empty or less full.

As described further below, each of the components, i.e., each of bus master engines 305, buffers 315 and/or communication medium interfaces 220 buffers 315 are dynamically configurable so that one or more of these like components may be associated with a respective peripheral bus function. For example, buffers 315 are dynamically configurable so that one or more buffers 315 may be associated with a respective peripheral bus function. For example, if only one peripheral bus function is occurring, and the respective peripheral bus function has relative large buffering requirements, then a subset or all of the buffers may be configured to store data during execution of this peripheral bus function. This may operate to prevent overflow of buffers during execution of this peripheral bus function.

Once buffer(s) 315 associated with a particular peripheral bus function contain(s) a certain amount of data or samples, e.g. contents half full or almost full, those A/D samples may then be transferred to main memory 105 to be processed by processor 101. After buffer(s) 315 is (are) almost full or half full, bus master engine(s) 305 associated with the same peripheral bus function generate(s) a peripheral bus request to request control of the peripheral bus, such as PCI bus 106. Once the PCI arbiter (not shown) grants control of the PCI bus 106 to the requested bus master engine(s) 305, bus master engine(s) 305 transfer(s) the contents, i.e., A/D samples, of the respective buffer(s) 315 to main memory 105 to be processed by processor 101. It is noted that the bus master engine(s) 305 may be associated with other peripheral bus functions as well. Cross-bar switch 310 is configured to allow any of the plurality of bus master engines 305 to transfer data from any of the plurality of buffers 315 to main memory 105.

During a write operation, processor 101 creates output data or samples that may be stored in main memory 105. Bus master engine(s) 305, after receiving control of the peripheral bus, such as PCI bus 106, from PCI arbiter (not shown), transfer(s) the output samples from main memory 106 to buffer(s) 315 associated with the particular peripheral bus function, i.e., the peripheral bus function associated with the output samples. In a particular embodiment, if more than one buffer 315 is associated with the peripheral bus function, bus master engine(s) 305 will transfer the output samples into the plurality of buffer(s) 315, e.g., to buffers that are empty or less full. Cross-bar switch 310 is configured to allow any of the plurality of bus master engines 305 to transfer data from main memory 105 to any of the plurality of buffers 315.

Output samples stored in buffer(s) 315 will then be sent across the serial interface of communication medium interface(s) 220 associated with the particular peripheral bus function via bus interface unit 320 and serial link bus 325 to the D/A converter. Bus interface unit 320 is configured to transfer the output samples from buffer(s) 315 to the proper communication medium interface(s) 220 associated with the particular peripheral bus function, i.e., peripheral bus function associated with the output samples. The D/A converter in communication medium interface(s) 220 is coupled to receive the output samples transferred from buffer(s) 315. The D/A converter may then optionally convert the output samples into analog format before being transmitted across the transmission medium.

Figure 4:
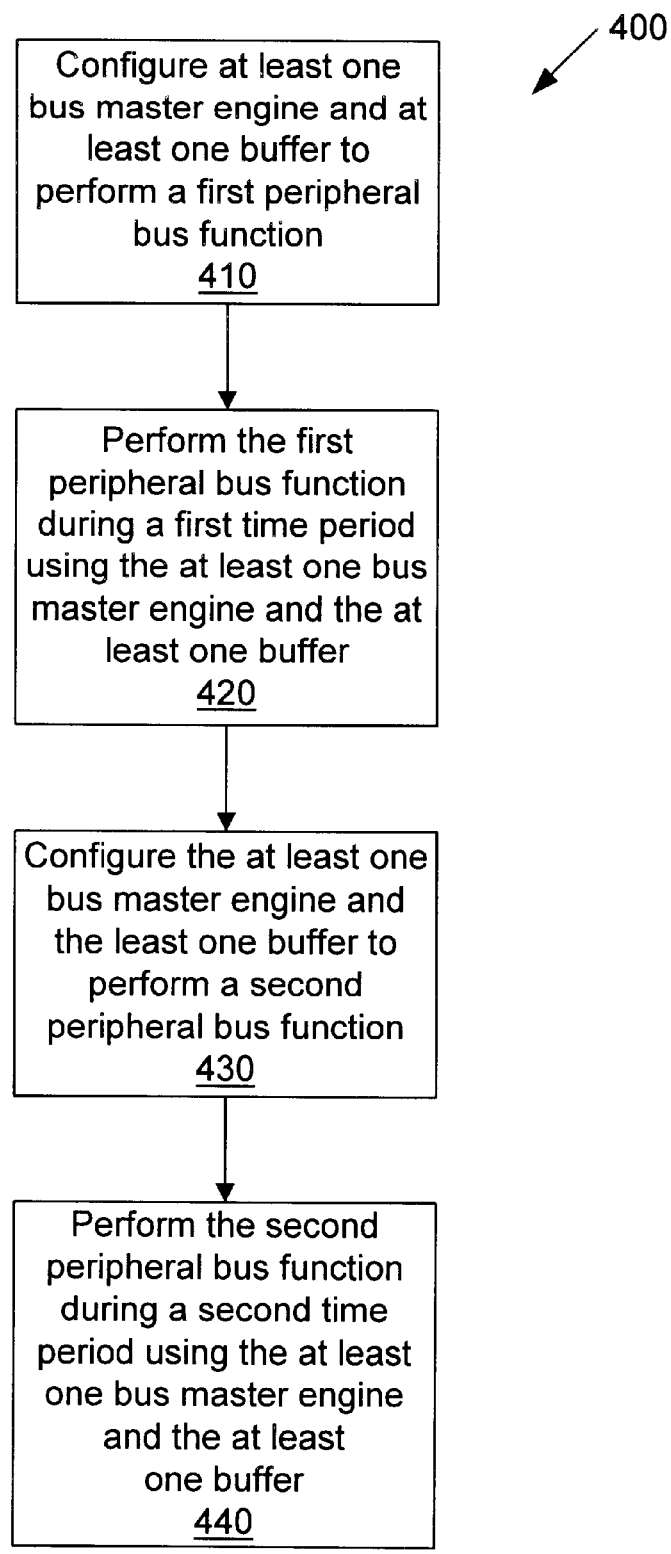
FIG. 4 is a flowchart illustrating a method for performing communications according to one embodiment of the present invention.

FIG. 4—Method for Performing Communications in One Embodiment

FIG. 4 is a flowchart illustrating a method 400 for performing communications according to an embodiment of the present invention.

In step 410, at least one of the plurality of bus master engines 305, at least one of the plurality of buffers 315 and at least one of the plurality of communication medium interfaces 220 may be configured for operation. The components may be configured, such as by a driver, e.g., modem driver, to perform a first peripheral bus function. In another particular embodiment, the operating system, application software, or BIOS configures these components. As described above, the components are configured by writing values to registers, preferably in one or more of the bus master engines 305.

In step 420, the first peripheral bus function is performed during a first time period using the at least one of the plurality of bus master engines 305, the at least one of the plurality of buffers 315 and the at least one of the plurality of communication medium interfaces 220. Performing the first peripheral bus function may include transferring data between main memory 105 and the at least one of the plurality of buffers 315 by the at least one of the bus master engines 305. Performing the first peripheral bus function may further include transferring data between at least one of the plurality of buffers 315 and the at least one of the plurality of communication medium interfaces 220.

In step 430, typically after the first peripheral bus function has completed, one or more of the at least one of the plurality of bus master engines 305, the at least one of the plurality of buffers 315 and the at least one of the plurality of communication medium interfaces 220 are configured (or re-configured) to perform a second peripheral bus function. Thus one or more of the bus master engine 305, the buffer(s) 315, and the communication medium interface 220 may be re-used among two or more different peripheral bus functions during different time periods. The reconfiguration may be performed such as by the driver, e.g., modem driver, to perform this second peripheral bus function. In another particular embodiment, the operating system, application software, or the BIOS configures the components to perform the second peripheral bus function. As described above, the components are configured by writing new values to registers, preferably in one or more of the bus master engines 305.

In step 440, the second peripheral bus function is performed during a second time period using the at least one of the plurality of bus master engines 305, the at least one of the plurality of buffers 315 and the at least one of the plurality of communication medium interfaces 220. Performing the second peripheral bus function again includes transferring data between main memory 105 and the at least one of the plurality of buffers 315 by the at least one of the bus master engines 305. Performing the second peripheral bus function may further include transferring data between the at least one of the plurality of buffers 315 and the at least one of the plurality of communication medium interfaces 220.

Thus, the flowchart of FIG. 4 illustrates that the bus master engines 305, the plurality of buffers 315 and the communication medium interfaces 220 can be dynamically reconfigured on an as-needed basis to perform different peripherall bus functions, thus possibly reducing the amount of hardware components necessary in the system, and thus also possibly allowing different combinations of components to be used together.

Figure 5:
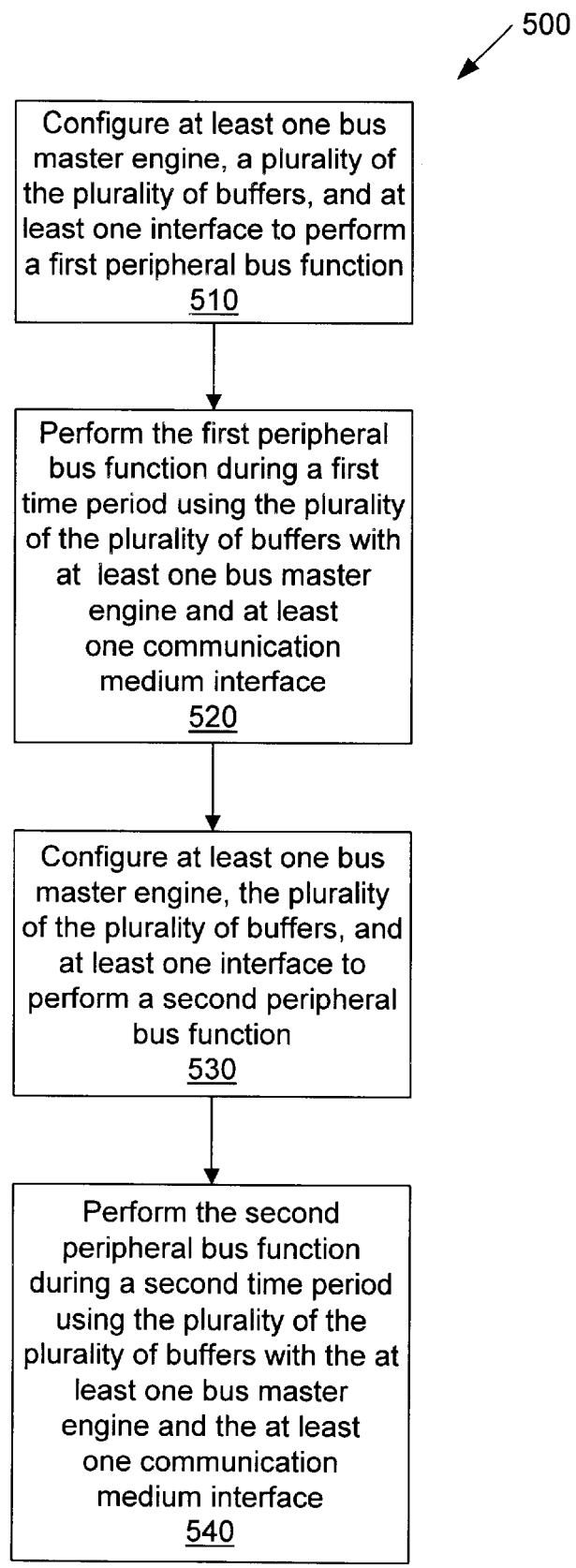
FIG. 5 is a flowchart illustrating another method for performing communications according to one embodiment of the present invention.

FIG. 5—Method for Performing Communications in an Alternate Embodiment

FIG. 5 is a flowchart illustrating another method 500 for performing communications according to an embodiment of the present invention. In this embodiment, during execution of a peripheral bus function, a plurality of like components, such as a plurality of buffers can be dynamically aggregated and used together to perform the peripheral bus function. After the respective peripheral bus function has been performed, the plurality of buffers can be dynamically assigned to other functions, as needed. The following describes one embodiment of the invention where a plurality of buffers are used together with one or more bus master engines 305 and one or more communication medium interfaces 220 to perform a peripheral bus function. Thus, in the embodiment described below, the plurality of buffers can be assigned and re-assigned dynamically to different peripheral bus functions on an as-needed basis, e.g., dependent on the buffering requirements of the respective different peripheral bus functions.

In step 510, at least one of the plurality of bus master engines 305, a plurality of the buffers 315 and at least one of the plurality of communication medium interfaces 220 are configured for operation. Thus, for example, a plurality of buffers can be configured with one bus master engine and one communication medium interface to perform a first peripheral bus function. The method may involve, for example, software determining the buffering requirements of the first peripheral bus function, determine the number of available buffers, optionally estimate future buffer requirements, and then assign two or more buffers to the first peripheral bus function to ensure adequate buffering without overflows. The components may be configured by a driver, e.g., modem driver, to perform the first peripheral bus function. In another particular embodiment, the operating system, application software, or BIOS configures these components. As described above, the components are preferably configured by writing values to registers, preferably in one or more of the bus master engines 305.

In step 520, the first peripheral bus function is performed during a first time period using the plurality of the plurality of buffers 315 with at least one of the plurality of bus master engines 305 and at least one of the plurality of communication medium interfaces 220. The plurality of buffers may be used as a single monolithic storage area, or may be used in a ping-pong fashion. For example, data may me provided equally to each of the plurality of buffers, or may be provided to a second buffer only when a first buffer reaches a certain threshold of data. Performing the first peripheral bus function may include transferring data between the main memory 105 and the plurality of the plurality of buffers 315 by the at least one of the bus master engines 305. Performing the first peripheral bus function may also include transferring data between the plurality of the plurality of buffers 315 and the at least one of the plurality of communication medium interfaces 220.

In step 530, at least one of the plurality of bus master engines 305, possibly a different bus master engine 305 than used in steps 510 and 520, a plurality of the buffers 315, possibly a different plurality of the buffers 315 than used in steps 510 and 520, and at least one of the plurality of communication medium interfaces 220, possibly a different communication medium interface 220 than used in steps 510 and 520, are configured for operation to perform a second peripheral bus function. This configuration in step 530 may also be based on a number of criteria, such as buffering requirements of the second peripheral bus function, number of available buffers, etc.

In step 540, the second peripheral bus function is performed during a second time period using the plurality of buffers 315 with at least one of the plurality of bus master engines 305 and at least one of the plurality of communication medium interfaces 220 configured in step 530. Performing the second peripheral bus function may include transferring data between main memory 105 and the plurality of the plurality of buffers 315 by the at least one of the bus master engines 305. Performing the second peripheral bus function further includes transferring data between the plurality of the plurality of buffers 315 and the at least one of the plurality of communication medium interfaces 220.

Thus, the flowchart of FIG. 5 illustrates that one or more of the bus master engines 305, the plurality of buffers 315 and the communication medium interfaces 220 can be dynamically configured or aggregated together to be used in a single peripheral bus function. This allows different combinations of components to be dynamically used together, allowing optimal use of the components in the system.

Although the system and method of the present invention is described in connection with several embodiments, it is not intended to be limited to the specific forms set forth herein, but on the contrary, it is intended to cover such alternatives, modifications, and equivalents, as can be reasonably included within the spirit and scope of the invention as defined by the appended claims. It is noted that the headings are used only for organizational purposes and not meant to limit the scope of the description or claims.

What is claimed is:

1. A computer system, comprising:
   a processor;
   a memory coupled to said processor;
   a peripheral bus coupled to said memory and processor;
   a bridge coupled to said peripheral bus, wherein said bridge comprises:
      a peripheral bus interface coupled to said peripheral bus; and
      a communication controller coupled to said peripheral bus interface, wherein said communication controller comprises:
         a plurality of buffers each configured to store data;
         a plurality of bus master engines coupled to said plurality of buffers, wherein said plurality of bus master engines are configured to transfer data from said plurality of buffers to said memory, and wherein said plurality of bus master engines are configured to transfer data from said memory to said plurality of buffers; and
         a bus interface unit coupled to said plurality of buffers; and
      a plurality of communication medium interfaces coupled to said bus interface unit in said communication controller, wherein each of said plurality of communication medium interfaces is configured to receive data from a transmission medium and store the data in at least one of said plurality of buffers, wherein each of said plurality of communication medium interfaces is configured to receive data from at least one of said plurality of buffers and provide the data to the transmission medium;
   wherein at least one of said plurality of bus master engines and at least one of said plurality of buffers are dynamically configurable so that a set of the at least one of said plurality of bus master engines and the at least one of said plurality of buffers can be used to perform multiple peripheral bus functions that do not operate simultaneously.

2. The computer system as recited in claim 1,
   wherein the at least one of said plurality of bus master engines, the at least one of said plurality of buffers, and at least one of said plurality of communication medium interfaces are dynamically configurable so that a set of the at least one of said plurality of bus master engines and the at least one of said plurality of buffers and the at least one of said plurality of communication medium interfaces can be used in multiple peripheral bus functions that do not operate simultaneously.

3. The computer system as recited in claim 1, wherein said plurality of buffers are dynamically configurable so that a plurality of said plurality of buffers can be used together with at least one of said plurality of bus master engines and at least one of said communication medium interfaces to perform a single peripheral bus function.

4. The computer system as recited in claim 1, wherein said plurality of bus master engines and said plurality of buffers are dynamically configurable so that a plurality of said plurality of bus master engines and a plurality of said plurality of buffers can be used together with one of said communication medium interfaces to perform a single peripheral bus function.

5. The computer system as recited in claim 1, wherein said communication controller further includes a crossbar switch coupled between said plurality of bus master engines and said plurality of buffers, wherein said crossbar switch is configured to allow any of said plurality of bus master engines to transfer data to or from any of said plurality of buffers.

6. The computer system as recited in claim 1, wherein each of said plurality of communication medium interfaces comprises:
    an A/D converter coupled to receive data transmitted across said transmission medium;
    a D/A converter coupled to receive data transmitted from at least one of said plurality of buffers of said digital communication controller; and
    a serial interface coupled to said A/D converter and D/A converter and said communication controller.

7. The computer system as recited in claim 1, wherein said plurality of communication medium interfaces includes a first communication medium interface configured to receive and transmit data according to a first rate and a first protocol, and a second communication medium interface configured to receive and transmit data according to a second rate and a second protocol.

8. The computer system as recited in claim 1, wherein each of said plurality of bus master engines comprises:
    a plurality of registers associated with a peripheral bus configuration space, wherein said peripheral bus configuration space is associated with a particular peripheral bus function, wherein at least one of said plurality of registers defines a memory and an I/O space of said particular peripheral bus function;
    wherein, for at least one of said bus master engines, a size of said memory and I/O space is dynamically configurable by the processor.

9. The computer system as recited in claim 1, wherein each of said plurality of communication medium interfaces is configured to receive and transmit data according to one of the following protocols: high-bit-rate digital communication controller (HDSL), very high-bit-rate digital communication controller (VDSL), asymmetrical digital communication controller (ADSL), G. Lite, ethernet PHY, V.90 and ATM.

10. The computer system as recited in claim 1, wherein the peripheral bus functions include one or more of a voice-band modem, DSL modem, AC 97 modem, LAN, USB controller, Ethernet controller and a PCI to ISA bridge.

11. A system comprising:
    a communication controller, wherein said communication controller comprises:
        a plurality of buffers each configured to store data;
        a plurality of bus master engines coupled to said plurality of buffers, wherein said plurality of bus master engines are configured to transfer data from said plurality of buffers to a memory, and wherein said plurality of bus master engines are configured to transfer data from the memory to said plurality of buffers; and
        a bus interface unit coupled to said plurality of buffers; and
    a plurality of communication medium interfaces coupled to said bus interface unit in said communication controller, wherein each of said plurality of communication medium interfaces is configured to receive data from a transmission medium and store the data in at least one of said plurality of buffers, wherein each of said plurality of communication medium interfaces is configured to receive data from at least one of said plurality of buffers and provide the data to the transmission medium;
    wherein at least one of said plurality of bus master engines and at least one of said plurality of buffers are dynamically configurable so that a set of the at least one of said plurality of bus master engines and the at least one of said plurality of buffers can be used to perform multiple peripheral bus functions that do not operate simultaneously.

12. The system as recited in claim 11, wherein the at least one of said plurality of bus master engines, the at least one of said plurality of buffers, and at least one of said plurality of communication medium interfaces are dynamically configurable so that a set of the at least one of said plurality of bus master engines and the at least one of said plurality of buffers and the at least one of said plurality of communication medium interfaces can be used in multiple peripheral bus functions that do not operate simultaneously.

13. The system as recited in claim 11, wherein said plurality of buffers are dynamically configurable so that a plurality of said plurality of buffers can be used together with at least one of said plurality of bus master engines and at least one of said communication medium interfaces to perform a single peripheral bus function.

14. The system as recited in claim 11, wherein said plurality of bus master engines and said plurality of buffers are dynamically configurable so that a plurality of said plurality of bus master engines and a plurality of said plurality of buffers can be used together with one of said communication medium interfaces to perform a single peripheral bus function.

15. The system as recited in claim 11, wherein said communication controller further includes a crossbar switch coupled between said plurality of bus master engines and said plurality of buffers, wherein said crossbar switch is configured to allow any of said plurality of bus master engines to transfer data to or from any of said plurality of buffers.

16. A computer system, comprising:
    a processor;
    a memory coupled to said processor;
    a peripheral bus coupled to said memory and processor;
    a bridge coupled to said peripheral bus, wherein said bridge comprises:
        a plurality of buffers each configured to store data;
        a plurality of bus master engines coupled to said plurality of buffers, wherein said plurality of bus master engines are configured to transfer data from said plurality of buffers to said memory, and wherein said plurality of bus master engines are configured to transfer data from said memory to said plurality of buffers; and a bus interface unit coupled to said plurality of buffers; and a plurality of interfaces coupled to said bus interface unit in said bridge, wherein each of said plurality of interfaces is configured to receive data from a transmission medium and store the data in at least one of said plurality of buffers, wherein each of said plurality of interfaces is configured to receive data from at least one of said plurality of buffers and provide the data to the transmission medium;

wherein at least one of said plurality of bus master engines and at least one of said plurality of buffers are dynamically configurable so that a set of the at least one of said plurality of bus master engines and the at least one of said plurality of buffers can be used to perform multiple peripheral bus functions that do not operate simultaneously.

17. The computer system as recited in claim 16, wherein the at least one of said plurality of bus master engines, the at least one of said plurality of buffers, and at least one of said plurality of communication medium interfaces are dynamically configurable so that a set of the at least one of said plurality of bus master engines and the at least one of said plurality of buffers and the at least one of said plurality of communication medium interfaces can be used in multiple peripheral bus functions that do not operate simultaneously.

18. The computer system as recited in claim 16, wherein said plurality of buffers are dynamically configurable so that a plurality of said plurality of buffers can be used together with at least one of said plurality of bus master engines and at least one of said communication medium interfaces to perform a single peripheral bus function.

19. The computer system as recited in claim 16, wherein said plurality of bus master engines and said plurality of buffers are dynamically configurable so that a plurality of said plurality of bus master engines and a plurality of said plurality of buffers can be used together with one of said communication medium interfaces to perform a single peripheral bus function.

20. The computer system as recited in claim 16 further comprising a communication controller including a crossbar switch coupled between said plurality of bus master engines and said plurality of buffers, wherein said crossbar switch is configured to allow any of said plurality of bus master engines to transfer data to or from any of said plurality of buffers.

21. A method for performing communications using a computer system, wherein the computer system includes a processor, a memory coupled to the processor, a peripheral bus coupled to the memory and processor, and a bridge coupled to the peripheral bus, wherein the bridge comprises a plurality of buffers each configured to store data, a plurality of bus master engines coupled to the plurality of buffers, and a bus interface unit coupled to the plurality of buffers, wherein a plurality of interfaces are coupled to the bus interface unit, the method comprising:

configuring at least one of said plurality of bus master engines and at least one of said plurality of buffers to perform a first peripheral bus function;

performing the first peripheral bus function using the at least one of said plurality of bus master engines and the at least one of said plurality of buffers during a first time period, wherein said performing includes transferring data using the at least one of said plurality of bus master engines and the at least one of said plurality of buffers;

configuring the at least one of said plurality of bus master engines and the at least one of said plurality of buffers to perform a second peripheral bus function after said performing the first peripheral bus function; and performing the second peripheral bus function using the at least one of said plurality of bus master engines and the at least one of said plurality of buffers during a second time period, wherein said performing includes transferring data using the at least one of said plurality of bus master engines and the at least one of said plurality of buffers.

22. The method as recited in claim 21, wherein said configuring to perform the first peripheral bus function includes configuring at least one of said plurality of communication medium interfaces;

wherein said configuring to perform the second peripheral bus function includes configuring the at least one of said plurality of communication medium interfaces.

23. The method as recited in claim 21, configuring a plurality of said plurality of buffers to be used together with at least one of said plurality of bus master engines and at least one of said communication medium interfaces to perform a single peripheral bus function; and performing the single peripheral bus function using the at least one of said plurality of bus master engines, the plurality of said plurality of buffers, and the at least one of said communication medium interfaces.

24. The method as recited in claim 21, configuring a plurality of said plurality of bus master engines and a plurality of said plurality of buffers to be used together with one of said communication medium interfaces to perform a single peripheral bus function; and performing the single peripheral bus function using the plurality of said plurality of bus master engines, the plurality of said plurality of buffers and the at least one of said communication medium interfaces.

25. A computer system, comprising:

a processor;

a memory coupled to said processor;

a peripheral bus coupled to said memory and processor;

a bridge coupled to said peripheral bus, wherein said bridge comprises:

a plurality of buffers each configured to store data;

a plurality of bus master engines coupled to said plurality of buffers, wherein said plurality of bus master engines are configured to transfer data from said plurality of buffers to said memory, and wherein said plurality of bus master engines are configured to transfer data from said memory to said plurality of buffers; and a bus interface unit coupled to said plurality of buffers; and a plurality of interfaces coupled to said bus interface unit in said bridge, wherein each of said plurality of interfaces is configured to receive data from a transmission medium and store the data in at least one of said plurality of buffers, wherein each of said plurality of interfaces is configured to receive data from at least one of said plurality of buffers and provide the data to the transmission medium;

wherein said plurality of buffers are dynamically configurable so that a plurality of said plurality of buffers can be used together with at least one of said plurality of bus master engines and at least one of said communication medium interfaces to perform a single peripheral bus function.

26. The computer system as recited in claim 25, wherein said plurality of bus master engines and said plurality of buffers are dynamically configurable so that a plurality of said plurality of bus master engines and a plurality of said plurality of buffers can be used together with one of said communication medium interfaces to perform a single peripheral bus function.

27. The computer system as recited in claim 25, wherein at least one of said plurality of bus master engines and at least one of said plurality of buffers are dynamically configurable so that a set of the at least one of said plurality of bus master engines and the at least one of said plurality of buffers can be used to perform multiple peripheral bus functions that do not operate simultaneously.

28. A method for performing communications using a computer system, wherein the computer system includes a processor, a memory coupled to the processor, a peripheral bus coupled to the memory and processor, and a bridge coupled to the peripheral bus, wherein the bridge comprises a plurality of buffers each configured to store data, a plurality of bus master engines coupled to the plurality of buffers, and a bus interface unit coupled to the plurality of buffers, wherein a plurality of interfaces are coupled to the bus interface unit, the method comprising:

configuring a plurality of said plurality of buffers to perform a first peripheral bus function;

performing the first peripheral bus function using the plurality of said plurality of buffers with at least one of said plurality of bus master engines and at least one of said plurality of communication medium interfaces during a first time period, wherein said performing includes transferring data using the at least one of said plurality of bus master engines and the plurality of said plurality of buffers;

configuring the plurality of said plurality of buffers to perform a second peripheral bus function after said performing the first peripheral bus function; and performing the second peripheral bus function using the plurality of said plurality of buffers with the at least one of said plurality of bus master engines and the at least one of said plurality of communication medium interfaces during a second time period, wherein said performing includes transferring data using the at least one of said plurality of bus master engines and the plurality of said plurality of buffers.

29. The method as recited in claim 28, wherein said configuring to perform the first peripheral bus function includes configuring at least one of said plurality of communication medium interfaces and at least one of said plurality of bus master engines;

wherein said configuring to perform the second peripheral bus function includes configuring the at least one of said plurality of communication medium interfaces and the at least one of said plurality of bus master engines.

30. The method as recited in claim 28, configuring a plurality of said plurality of bus master engines and the plurality of said plurality of buffers to be used together with at least one of said communication medium interfaces to perform a single peripheral bus function; and performing the single peripheral bus function using the plurality of said plurality of bus master engines, the plurality of said plurality of buffers and the at least one of said communication medium interfaces.

31. The method as recited in claim 28, configuring a plurality of said plurality of communication medium interfaces and the plurality of said plurality of buffers to be used together with at least one of said plurality of bus master engines to perform a single peripheral bus function; and performing the single peripheral bus function using the plurality of said plurality of communication medium interfaces, the plurality of said plurality of buffers and the at least one of said bus master engines.

\* \* \* \* \*